United States Patent [19]

Kaneda et al.

[11] Patent Number: 4,612,244
[45] Date of Patent: Sep. 16, 1986

[54] MAGNETIC RECORDING MEDIUM

[75] Inventors: Koji Kaneda, Dothan, Ala.; Masayoshi Sugiyama, Miyagi, Japan

[73] Assignee: Sony Corporation, Tokyo, Japan

[21] Appl. No.: 656,227

[22] Filed: Oct. 1, 1984

[30] Foreign Application Priority Data

Oct. 4, 1983 [JP] Japan .................................. 58-184403

[51] Int. Cl.$^4$ ................................................. G11B 5/72
[52] U.S. Cl. .................................... 428/323; 360/134; 360/135; 360/136; 427/128; 427/131; 428/408; 428/423.1; 428/423.7; 428/425.5; 428/425.9; 428/480; 428/694; 428/900
[58] Field of Search ...................... 428/425.9, 323, 694, 428/900, 423.7, 423.1, 480, 408, 425.5; 427/131, 128, 44; 360/134-136

[56] References Cited

U.S. PATENT DOCUMENTS

| | | | |
|---|---|---|---|
| 4,152,485 | 5/1979 | Mizumura | 428/425.9 |
| 4,328,935 | 5/1982 | Steel | 428/900 |
| 4,419,406 | 12/1983 | Isobe | 428/900 |
| 4,420,531 | 12/1983 | Tokuda | 428/694 |
| 4,529,661 | 7/1985 | Ninomiya | 428/425.9 |

FOREIGN PATENT DOCUMENTS 2054622A  2/1981  United Kingdom ................ 428/694

*Primary Examiner*—Ellis P. Robinson
*Attorney, Agent, or Firm*—Hill, Van Santen, Steadman & Simpson

[57] ABSTRACT

A magnetic recording medium is disclosed, in which a magnetic layer is formed on one surface of the non-magnetizable substrate and a back coating layer consisting essentially of a binder and a non-magnetizable pigment is formed on the other surface of the substrate. In the back coating layer, more than 80 weight percent of the binder is a polyurethane resin or a polyester resin having hydrophilic polar groups. The back coating layer also contains carbon black for preventing electrostatic charging and pigments with Mohs hardness higher than 5 for improving durability. The carbon black to the pigments weight ratio is set to be in the range of 95:5 to 60:40.

7 Claims, No Drawings

MAGNETIC RECORDING MEDIUM

BACKGROUND OF THE INVENTION

1. Field of the Invention

This invention relates to a magnetic recording medium, such as magnetic tape and, more particularly, to an improvement in a back coating layer provided to the reverse side of the substrate with respect to the magnetic layer for prevention of loose winding or electrostatic charging.

2. Description of the Prior Art

In preparing a magnetic recording medium in general, a magnetic paint formed by dispersing and kneading ferromagnetic particles, binder, dispersant and lubricant in an organic solvent is coated on a non-magnetizable substrate such as polyester film and dried to a magnetic layer.

When desired to improve the properties of the magnetic recording medium such as magnetic tape used in a VTR for providing a higher image quality, it is necessary to reduce the particle size of the ferromagnetic particles contained in the magnetic layer and to elevate packing density while elaborating the surface of the magnetic layer to a smooth finish so as to provide for a more intimate contact between the magnetic layer and the magnetic head. For realizing a smoother surface of the magnetic layer, it is also essential to improve smoothness of the surface of the non-magnetizable substrate.

However, when surface smoothness of the magnetic layer and/or the substrate is elevated in this manner, the magnetic recording medium is likely to be tightly affixed to, for example, the guide member of a magnetic recording and/or reproducing device, when the magnetic recording medium is a magnetic tape. This gives rise to increased friction and deteriorated running characteristics. Moreover, there may occur powder debris or wear of the substrate. In addition, a so-called air film may be formed between the adjacent tape turns with resultant loose winding.

In order to overcome such deficiency, it has also been customary to provide a back coating layer on the opposite side of the non-magnetizable substrate with respect to the magnetic layer.

However, the conventional back coating layer is not entirely satisfactory especially with respect to running durability and surface roughness of the back coating layer itself, thus occasionally causing deterioration in an S/N ratio, increase in dropouts. In addition, wear or powder debris may be caused to the back coating layer, the back coating layer may be bonded to the magnetic layer or loose winding may be caused. Up to now, there exists no back coating layer capable of tolerably satisfying the various criteria demanded of the back coating layer.

SUMMARY OF THE INVENTION

It is therefore an object of the present invention to provide a magnetic recording medium having a back coating layer excellent in running durability.

It is another object of the present invention to provide a magnetic recording medium exhibiting excellent running characteristics and relatively free of loose winding through formation of a back coating layer endowed with moderate surface roughness.

It is a further object of the present invention to provide a magnetic recording medium wherein dispersibility of the powdered components and the binder that make up the back coating layer is improved for obviating deteriorated S/N ratio and decreased dropouts that are detrimental to the properties of the magnetic layer.

It is a still further object of the present invention to provide a magnetic recording medium wherein the back coating layer is not likely to become affixed to the magnetic layer when the tape is taken up on the winding spool.

The present invention provides a magnetic recording medium comprising a non-magnetizable substrate, a magnetic layer formed on one surface of said non-magnetizable substrate and a back coating layer composed of a binder and non-magnetizable pigment formed on the other surface of said non-magnetizable substrate, said binder being composed of at least one of a polyester resin having hydrophilic group and a polyurethane resin having hydrophilic group, said hydrophilic group being selected from the group consisting of groups having the general formulas;

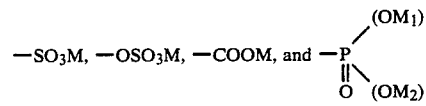

wherein M is hydrogen, lithium, sodium, or potassium; and $M_1$ and $M_2$ are hydrogen, lithium, sodium, potassium or alkyl groups, and said non-magnetizable pigment being composed of carbon black and non-magnetizable pigment having Mohs hardness not less than 5, and weight ratio of said carbon black to said non-magnetizable pigment being from 60:40 to 95:5.

According to the present invention, owing to the provision of the back coating layer composed of a polyurethane or polyester resin having hydrophilic polar groups, pigments and carbon black pursuant to relevant standards, the magnetic recording medium is excellent is running and durability, whilst the wear caused to the guide member is minimized. Moreover, since the back coating layer has a moderate surface roughness, it is possible to suppress powder debris, dropouts or deteriorated S/N ratio that are extremely detrimental to the magnetic layer. In addition, since the polyurethane or polyester resin having hydrophilic polar groups is used as the binder of the back coating layer, it is possible to prevent the back coating layer from adhering to the magnetic layer.

DETAILED DESCRIPTION OF THE INVENTION

As the resin materials used as the binder for the back coating layer, a polyurethane resin or a polyester resin into which are introduced hydrophilic polar groups selected from

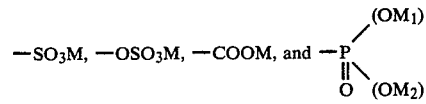

wherein M represents a hydrogen atom or an alkali metal and $M_1$, $M_2$ represent hydrogen atoms, alkali metals or hydrocarbon groups, may be employed.

The aforementioned hydrophilic polar groups may be introduced into the polyurethane or polyester resin by any of the following methods.

(i) The aforementioned hydrophilic polar groups are introduced in advance into dibasic acids or polyols from which polyurethane or polyester is subsequently prepared.

(ii) The polyurethane or polyester resin having bifunctional or trifunctional —OH groups is denatured suitably.

Any of the following methods may be resorted to for denaturing the polyurethane or polyester resins.

(A) A compound having both hydrophilic polar groups and chlorine in its molecule, such as $ClCH_2CH_2SO_3M$, $ClCH_2CH_2OSO_3M$, $ClCH_2COOM$ or

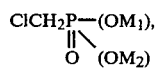

wherein M represents a hydrogen atom or an alkali metal and $M_1$, $M_2$ represent hydrogen atoms, alkali metals or hydrocarbon groups, and a polyurethane or polyester resin having polyfunctional OH groups, are dissolved into a common solvent to the two reactants, such as dimethylformamide or dimethylsulfoxide, and subjected to a reaction in the presence of pyridine, picoline, amines such as triethylamine or epoxy compounds such as ethylene oxide or propylene oxide under introduction of the hydrophilic polar groups and simultaneous formation and removal of hydrochloric acid. This reaction may be writted by the following chemical formulae A-1 through A-4.

$$R—OH + ClCH_2CH_2SO_3M \longrightarrow R—OCH_2CH_2SO_3M + HCl \quad (A-1)$$

$$R—OH + ClCH_2CH_2OSO_3M \longrightarrow \quad (A-2)$$
$$R—OCH_2CH_2OSO_3M + HCl$$

$$R—OH + ClCH_2COOM \longrightarrow R—OCH_2COOM + HCl \quad (A-3)$$

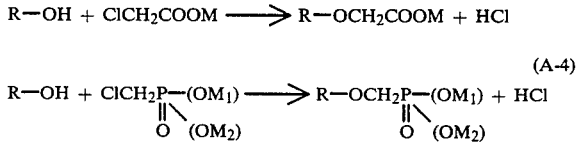

where R represents a polyurethane or a polyester resin.

The following method (B) may also be employed, although a small amount of a by-product is formed at this time.

(B) Equimolor amounts of $HOCH_2CH_2SO_3M$, $HOCH_2CH_2OSO_3M$, $HOCH_2COOM$ or

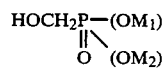

and a diisocyanate compound such as 4, 4'- diphenylmethanediisocyanate, tolylenediisocyanate or hexamethylenediisocyanate are reacted to a reaction product formed by one NCO group of the diisocyanate and the OH group in the molecule. The —OH group in the polyurethane or polyester resin and the remaining —NCO group are then reacted to a polyurethane or polyester resin into which hydrophilic polar groups are introduced.

$$OCN—R'—NCO + HOCH_2CH_2SO_3M \longrightarrow \quad (B-1)$$
$$OCN—R'—NHCOOCH_2CH_2SO_3M$$

$$R—OH + OCN—R'—NHCOOCH_2CH_2SO_3M \longrightarrow$$
$$R—OCONH—R'—NHCOOCH_2CH_2SO_3M$$

$$OCN—R'—NCO + HOCH_2CH_2OSO_2M \longrightarrow \quad (B-2)$$
$$OCN—R'—NHCOOCH_2CH_2OSO_3M$$

$$R—OH + OCN—R'—NHCOOCH_2CH_2OSO_3M \longrightarrow$$
$$R—OCONH—R'—NHCOOCH_2CH_2OSO_3M$$

$$OCN—R'—NCO + HOCH_2COOM \longrightarrow \quad (B-3)$$
$$OCN—R—NHCOOCH_2COOM$$

$$R—OH + OCN—R'—NHCOOCH_2COOM \longrightarrow$$
$$R—OCONH—R'—NHCOOCH_2COOM$$

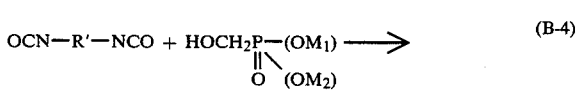

Where R represents polyurethane or polyester resin and R' divalent hydrocarbon groups.

As hydrophilic polar groups introduced into the polyurethane or polyester resin, —$SO_3M$ groups are most preferred, where M represents hydrogen atoms or alkali metals. As alkali metals indicated by M in the —$SO_3M$ group, sodium Na or potassium K is most preferred.

The ratio of the hydrophilic polar groups contained in the polyurethane or polyester resin is suitably 0.01 to 2 mg equivalents per gram of resin. If the ratio is too low, the effect of the hydrophilic groups on dispersibility is lowered. On the other hand, if the ratio is too high, solubility of the components in the common solvent is lowered so that a good paint is not obtained.

The polyurethane or polyester resin into which the hydrophilic polar groups are introduced in the above described manner may be used directly as the binder of the back coating layer, or combined with other resin materials, such as vinyl chloride-vinyl acetate copolymer, in consideration of hardness or heat resistancy. In this case, the polyurethane or polyester resin having the hydrophilic polar groups preferably accounts for more than 80 weight percent of the binder, otherwise the back coating layer is lowered running durability.

When the polyurethane or polyester resins having the hydrophilic polar groups are used as the binder, it is possible to improve dispersibility of powdered constituents such as carbon black or pigments mentioned below and to obtain a moderately smooth surface of the back coating layer by the presence of the hydrophilic polar groups. In addition, since the powdered constituents are bonded strongly with the binder due to the presence of the hydrophilic polar groups, the tendency for these powdered constituents to be detached from the tape surface is reduced, with the result that running durability of the back coating layer is improved markedly.

The carbon black with mean particle size of 0.02 to 0.1 μm and preferably 0.04 to 0.08 μm may be used with advantage in the present invention. The carbon black is useful to render the magnetic recording medium electrically conductive to prevent discharge noises.

The aforementioned pigments with Mohs hardness higher than 5 are also included in the back coating layer as the reinforcing agent. As these pigments, powders of inorganic materials with Mohs hardness in the range of 5 to 8 and the particle size in the range of 0.2 to 0.3 μm may be employed. As these materials, $TiO_2$, $ZrO_2$, $Cr_2O_3$ or $Fe_2O_3$ are preferred. These pigments are required for strengthening the boundary of the back coating layer and endowing sufficient strength and durability of the layer in spite of rough handling. Too low a hardness of the pigments or too small a particle size will render the strengthening effect of the pigments to be insufficient. On the other hand, too high a hardness of the pigments or too large a particle size may cause a situation that the fixed guide member provided in the video tape recorder or a cassette tape recorder is worn out. In addition it is preferred that the pigment particles be nearly spherical in shape. If the particle is pointed, the fixed guide member may be worn out in the similar manner.

The pigments with Mohs hardness higher than 5 are preferably mixed in an amount of 5 to 40 weight percent to the carbon black. If the ratio of the pigments is too low, the strengthening effect of the pigments is insufficient. If it is too high, the fixed guide is worn out in the similar manner.

The ratio of the powdered pigment and carbon black components to the binder is preferably 100 to 300 weight parts of the powdered components to 100 weight parts of the binder. Too large an amount of the powdered components may cause a situation that wear resistancy of the back coating layer lowered. Too large an amount of the binder may cause a situation that the back coating layer and the magnetic layer tend to become affixed to each other and the frictional coefficient is increased.

As the non-magnetizable substrate to be coated with the back coating layer, polyesters such as polyethylene terephthalate, polyethylene-2,6-naphthalate, polyolefines such as polyethylene or polypropyrene, cellulose derivatives such as cellulose triacetatebutyrate or cellulose acetate propionate, vinyl resins such as polyvinyl chloride or polyvinylidene chloride, polycarbonates, polyimides, polyamides, polyamidimides, polyhydrazides, non-magnetizable metals such as copper, tin, zinc or non-magnetizable alloys containing these metals, ceramics such as glass, porcelain or china, or paper with or without coating or lamination of α-polyolefines with 2 to 10 carbon atoms, such as polyethylene, polypropyrene or ethylene-butene copolymer, may be employed. The substrate may be in the form of a film, tape, sheet, disc, card or a drum, as the case may demand.

A polyisocyanate hardener may be added to the back coating paint of the above composition. The result of such addition of the hardener is the three-dimensional cross-linking at the time of polymerization of the binder and the consequent increase in the strength of the coating. If necessary, lubricants may be added to the back coating layer. As such lubricants, silicon oils such as dialkylpolysiloxane with 1 to 5 carbon atoms in the alkyl part, dialcoxypolysiloxane with 1 to 4 carbon atoms in the alcoxy part, monoalkylmonoalcoxypolysiloxane with 1 to 5 carbon atoms in the alkyl part and 1 to 4 carbon atoms in the alcoxy part, phenylpolysiloxane or fluoroalkylpolysiloxane with 1 to 5 carbon atoms in the alkyl part, fine powders of electrically conductive materials such as graphite, fine powders of inorganic materials such as molybdenum disulfide or tungsten disulfide, fine powders of plastics materials such as polyethylene polypropylene, polyethylenevinyl chloride copolymer or polytetrafluoroethylene, α-olefine polymer, unsaturated aliphatic hydrocarbons liquid at ambient temperature (compounds including n-olefine double bonds attached to the terminal carbon, with about 20 carbon atoms), aliphatic acid esters formed by monobasic aliphatic acids with 12 to 20 carbon atoms and monohydric alcohols with 3 to 12 carbon atoms, or fluorocarbons, may be employed. These lubricants may be used in an amount of 0.2 to 20 weight parts to 100 parts of the binder.

The magnetic layer is formed by dispersing powders of ferromagnetic materials in the binder and dissolving the resulting dispersion in an organic solvent to give a magnetic paint which is then coated on one surface of the non-magnetizable substrate.

Any suitable type of the ferromagnetic powders used in the art may be used in preparing the magnetic layer. Thus there may be used $\gamma$-$Fe_2O_3$, $Fe_3O_4$, iron oxides with the oxidized state intermediate $\gamma$-$Fe_2O_3$ and $Fe_2O_4$, cobalt containing $\gamma$-$Fe_2O_3$, cobalt containing $Fe_3O_4$, cobalt containing iron oxides with the oxidized state intermediate $\gamma$-$Fe_2O_3$ and $Fe_3O_4$, the aforementioned iron oxides with one or more metal elements, especially transition metal elements, the aforementioned iron oxides with a coating layer consisting essentially of cobalt oxides or hydroxides, magnetic particles of oxides such as $CrO_2$ with or without a superficial layer of $Cr_2O_3$ formed by a reducing treatment, fine powders of ferromagnetic metals or metal alloys such as Fe, Co, Ni, Fe-Co alloy, Fe-Ni alloy, Fe-Co-Ni alloy, Co-Ni-P alloy, Co-Ni-Fe-B alloy, Fe-Ni-Zn alloy, Fe-Mn-Zn alloy or Fe-Co-Ni-P alloy.

As the binder materials used for the magnetic layer, those used as the binder for the magnetic recording medium in the prior art practice may be used. Typical of these are a vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-styrene copolymer, thermoplastic polyurethane resin, phenoxy resin, polyvinyl fluoride, vinylidene chloride-acrylonitrile copolymer, butadieneacrylonitrile copolymer, acrylonitrile-butadienemethacrylic acid copolymer, polyvinylbutyral, cellulose derivatives, styrene-butadiene copolymer, polyester resin, phenol resin, epoxy resin, thermohardening polyurethane resin, urea resin, melamine resin, alkyd resin, ureaformaldehyde resin, or mixtures thereof. Hydrophilic polar groups can be introduced into these resins for improving dispersibility and affinity with the powders of ferromagnetic materials, as in the case of the binder used with the back coating layer. Alternatively, acrylic double bonds can be introduced into the resins in a manner so that the magnetic layer can be cured in a shorter time by irradiation of the electron beams.

The constituents of the magnetic layer are dissolved in an organic solvent to give a magnetic coating material or paint, which is then applied to the non-magnetizable substrate. As the solvent for the magnetic coating material, ketones such as acetone, methylethylketone, methylisobutylketone or cyclohexanone, alcohols such as methanol, ethanol, propanol or butanol, esters such as methyl acetate, ethyl acetate, butyl acetate, ethyl lactate or glycol acetate monoethylether, ethers, glycol ethers such as ethylene glycol dimethylether, ethylene glycol monoethylether or dioxane, aromatic hydrocarbons such as benzene, toluene or xylene, aliphatic hydrocarbons such as hexane or heptane, chlorinated hydrocarbons such as methylene chloride, ethylene chloride, carbon tetrachloride, chloroform, ethylenechlorohydrin or dichlorobenzene, or nitropropane, may be employed.

In addition to the binder and the magnetic particles, dispersants, lubricants, abrasives, antistatic additives or rust preventives, may be incorporated into the magnetic layer.

The present invention may be applied not only to the coating type magnetic recording medium in which the magnetic paint is applied to the substrate for forming the magnetic layer, but also to the vapor deposition tape, that is, the metal thin-film type magnetic recording medium, in which the vapor of the ferromagnetic metals or alloys is deposited on the non-magnetic substrate for forming the magnetic layer.

The present invention will be described further with reference to several specific Examples. It is to be noted that these Examples are given only by way of illustration and are not intended for limiting the scope of the invention.

EXAMPLE 1

The following ingredients were used for preparation of the magnetic layer.

| | |
|---|---|
| Co - coated $\gamma$ - $Fe_2O_3$ | 100 weight parts |
| vinyl chloride-vinyl acetate copolymer (prepared by U.C.C., VAGH) | 15 weight parts |
| polyurethane resin (prepared by Nippon Polyurethane KK, N-2304) | 10 weight parts |
| dispersant (lecithin) | 1 weight parts |
| lubricant (silicon oil) | 2 weight parts |
| abrasive ($Cr_2O_3$) | 2 weight parts |
| methylethylketone | 100 weight parts |
| methylisobutylketone | 50 weight parts |
| toluene | 50 weight parts |

These ingredients were kneaded for 48 hours in a ball mill and filtered through a $3\mu$-filter, 25 weight parts of Desmodule L (prepared by Bayer) were added to and mixed for 30 minutes with the kneaded product as a hardener. The resulting mixture was coated on a polyethylene terephthalate film 16 $\mu$m in thickness so that the mixture has a thickness of 6 $\mu$m when dried. The resulting coating was then processed for magnetic orientation and dried to the magnetic layer, which was then processed by calendering. Then, for preparing the back coating layer, 90 weight parts of carbon black, 10 weight parts of titanium oxide $TiO_2$ (with Mohs hardness equal to 6 and mean particle diameter equal to 0.25 $\mu$m) and 10 weight parts of polyurethane resin with contents of —$SO_3Na$ groups, were dispersed for 40 to 80 hours in a ball mill, and 20 weight parts of Coronate-L-50 (prepared by Nippon Polyurethane KK) related to the aforementioned —$SO_3Na$ group containing polyurethane resin binder were added to the resulting product for forming a back coating paint, which was then applied to the opposite surface of the calendered composite film with respect to the magnetic layer, for forming the back coating layer 1 $\mu$m in thickness.

The resulting composite sheet or film was cut to widths of half an inch for preparing a sample tape.

EXAMPLE 2

The sample tape was prepared by using the same method as in Example 1 except that chrome oxide $Cr_2O_3$ (Mohs hardness 8, mean particle size of 0.3 $\mu$m) was used instead of titanium oxide $TiO_2$ in the back coating paint of Example 1.

EXAMPLE 3

The sample tape was prepared by using the same method as in Example 1, except that —COOH containing polyurethane resin was used instead of —$SO_2Na$ group containing polyurethane resin in the back coating paint of Example 1.

EXAMPLE 4

The sample tape was prepared by using the same method as in Example 1 except that 40 weight parts of —$SO_3Na$ group containing polyurethane resin and 10 weight parts of vinyl chloride-vinyl acetate copolymer (prepared by U.C.C., VAGH) were used instead of 50 weight parts of —$SO_3Na$ group containing polyurethane resin in the back coating paint of Example 1.

COMPARATIVE EXAMPLE 1

The magnetic layer was formed as in Example 1 and the resulting composite sheet was cut to sample tapes and thus without formation of the back coating layer.

COMPARATIVE EXAMPLE 2

The magnetic layer was formed and the resulting composite sheet was calendered, as in Example 1, 100 weight parts of carbon black and 50 weight parts of polyurethane resin (prepared by Nippon Polyurethane KK, N-2304) free of hydrophilic polar groups were dispersed for 40 to 80 hours in a ball mill. To the resulting product was added 20 weight percent to the polyurethane resin binder of Coronate L-50 (prepared by Nippon Polyurethane KK) for forming a back coating paint, which was then applied to the opposite surface of the composite sheet with respect to the magnetic layer for forming a back coating layer 1 $\mu$m in thickness. The resulting composite sheet or tape was cut into sample tapes each $\frac{1}{2}$ inch wide.

COMPARATIVE EXAMPLE 3

The sample tape was prepared by using the same method as in Example 2, except that —$SO_3Na$ group containing polyurethane resin was used in place of polyurethane resin in the back coating paint.

COMPARATIVE EXAMPLE 4

The sample tape was prepared by using the same method as in Example 1 except that calcium carbonate $CaCO_3$ (Mohs hardness equal to 3 and mean particle diameter equal to 0.1 μm) was used instead of titanium oxide $TiO_2$ in the back coating layer of Example 1.

COMPARATIVE EXAMPLE 5

The sample tape was prepared by using the method same as in Example 1, except that polyurethane resin (prepared by Nippon Polyurethane KK, N-2304) free of hydrophilic polar groups was used in place of the $-SO_3Na$ group containing polyurethane resin in the back coating paint of Example 1.

COMPARATIVE EXAMPLE 6

The sample tape was prepared by using the method same as in Example 1, except that 30 weight parts of $-SO_3Na$ group containing polyurethane resin and 20 weight parts of vinyl chloride-vinyl acetate copolymer (prepared by U.C.C., VAGH) were used in place of 50 weight parts of $-SO_3Na$ group containing polyurethane resin in the back coating paint of Example 1.

The Table below shows characteristics of the sample tapes of the preceding Examples and Comparative Examples.

In the Table, durability of the back coating layer was measured by running the sample tapes 400 times at room temperature with the use of the marketed video tape recorder for home use and visually observing changes caused in the surface of the tape after the termination of running.

The marks O, Δ and ▲ in the Table stand for no changes, acceptable changes and unacceptable acute changes in the tape surface, respectively.

Wear caused to the guide member was measured by running the sample tapes 100 meters long 50 times back and forth on the stainless steel guide member under a back tension of 100 g, wrap angle of 90° and the tape speed of 1 meter/second and visually observing changes caused to the surface of the stainless steel guide member. The methods used for evaluation are the same as those mentioned above with respect to durability of the back coating layer.

As for frictional coefficient, the dynamic frictional coefficient was obtained from a formula $$\frac{1}{\pi} \log e \frac{T_2}{T_1}$$

Where $T_1$, $T_2$ represent an inlet tension and an outlet tension of an aluminium drum with a surface roughness equal to 1S, as measured under a wrap angle of 180° and a tape speed equal to 26 meters per second.

The initial video signal to noise ratio was comparatively obtained by recording the 50% white level signal with the optimum recording current for the standard tape with the use of the marketed home-use VTR and measuring the S/N ratio of the demodulated video signal being reproduced with the use of the video noise meter 925C of Shibasoku Company with the ratio for the standard tape being set to 0 dB.

Adhesion between the magnetic and back coating layer was measured by winding the sample tape on an aluminium reel of the outside diameter equal to 28 mm with the magnetic layer directed to the inside and boiling the tape and reel for 60 minutes in a pressure pot. The marks O, × in the Table represent the absence and presence of adhesion, respectively.

Increased dropouts were measured by visual observation and counting the number of changes in the number per minute of dropouts caused when the 120-minute sample tape was repeatedly operated for reproduction 100 times on end.

The winding properties were measured by running the 120-minute sample tape by three repeated fast forward and rewind operations with the use of the marketed VTR and visually observing the winding state of the sample tapes. In the Table, the marks O, × represent the good winding state with no gaps and the occurrence of gaps between the tape turns, respectively.

TABLE

| | durability of back-coating layer | wear to guide member | frictional coefficient | initial video S/N ratio (dB) | adhesion | increase in dropouts per minute | winding property |
|---|---|---|---|---|---|---|---|
| Example 1 | O | O | 0.25 | +1.6 | O | −3 | O |
| Example 2 | O | ▲ | 0.25 | +1.1 | O | ±0 | O |
| Example 3 | O | O | 0.25 | +1.7 | O | ±0 | O |
| Example 4 | O | Δ | 0.25 | +1.4 | O | +2 | O |
| Comparative Example 1 | ▲ | O | 0.35 | +1.7 | O | +10 | X |
| Comparative Example 2 | X | O | 0.25 | +1.0 | X | +7 | O |
| Comparative Example 3 | ▲ | O | 0.25 | +1.5 | O | +5 | O |
| Comparative Example 4 | Δ~▲ | O | 0.25 | +1.5 | O | +3 | O |
| Comparative Example 5 | Δ | Δ | 0.25 | +1.0 | X | +1 | O |
| Comparative Example 6 | Δ | Δ | 0.25 | +1.2 | O | +10 | O |

It is seen from the above Table that the properties of the tape for the Examples are superior to those for the Comparative Examples. Although the sample tape of the Example 2 is somewhat inferior in the wear caused to the guide member, this is probably ascribable to the angular shape of the $Cr_2O_3$ (chrome oxide) particles employed as the reinforcing agent for the back coating layer.

What is claimed is:

1. A magnetic recording medium comprising a nonmagnetizable substrate, a magnetic layer formed on one surface of said non-magnetizable substrate and a back coating layer composed of a binder and non-magnetizable pigment formed on the other surface of said non-magnetizable substrate, said binder being composed of at least one of a polyester resin having hydrophilic groups and a polyurethane resin having hydrophilic groups, in an amount of at least 80% by weight of said binder, said hydrophilic groups being selected from the group consisting of groups having the general formulas:

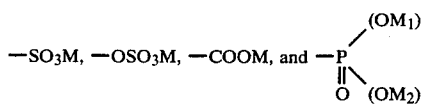

wherein M is hydrogen, lithium, sodium, or potassium; and $M_1$ and $M_2$ are hydrogen, lithium, sodium, potassium or alkyl groups, said hydrophilic groups being present in said resin in an amount between 0.01 and 2.0 mg equivalents/g and said non-magnetizable pigment being composed of carbon black having a mean particle diameter between 0.02 and 0.1 micron, and non-magnetizable pigment having Mohs hardness not less than 5, the weight ratio of said carbon black to said non-magnetizable pigment being from 60:40 to 95:5.

2. A magnetic recording medium according to claim 1, in which the amount of said non-magnetizable pigment is from 100 to 300 parts by weight per 100 parts by weight of said binder.

3. A magnetic recording medium according to claim 1, in which the mean particle diameter of said carbon black is from 0.04 to 0.08 μm.

4. A magnetic recording medium according to claim 1 in which the particle diameter of said non-magnetizable pigment having Mohs hardness not less than 5 is from 0.2 to 0.3 μm.

5. A magnetic recording medium according to claim 1, in which the Mohs hardness of said non-magnetizable pigment is from 5 to 8.

6. A magnetic recording medium according to claim 1, in which said non-magnetizable pigment having Mohs hardness not less than 5 is an inorganic pigment.

7. A magnetic recording medium according to claim 1, in which the shape of said non-magnetizable pigment having Mohs hardness not less than 5 is spherical.

* * * * *